(12) United States Patent  
Guven et al.

(10) Patent No.: US 10,694,355 B2  
(45) Date of Patent: *Jun. 23, 2020

(54) DEDICATED APN ACCESS USING DEFAULT NETWORK ACCESS KEY FOR PROFILE DOWNLOAD

(71) Applicant: Verizon Patent and Licensing Inc., Arlington, VA (US)

(72) Inventors: Musa Kazim Guven, Basking Ridge, NJ (US); Zhengfang Chen, Millburn, NJ (US); Hakan Alparslan, Middletown, NJ (US); Thomas W. McArtney, Long Valley, NJ (US); Balaji L. Raghavachari, Bridgewater, NJ (US); Christopher M. Schmidt, Branchburg, NJ (US); Tarun Verma, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,716

(22) Filed: May 11, 2018

(65) Prior Publication Data

US 2019/0058983 A1 Feb. 21, 2019

Related U.S. Application Data

(63) Continuation of application No. 15/680,889, filed on Aug. 18, 2017, now Pat. No. 9,998,896.

(51) Int. Cl.
*H04W 36/00* (2009.01)
*H04W 4/70* (2018.01)
(Continued)

(52) U.S. Cl.
CPC .......... *H04W 4/70* (2018.02); *H04B 1/3816* (2013.01); *H04L 67/306* (2013.01); *H04W 8/183* (2013.01);
(Continued)

(58) Field of Classification Search
CPC ....... H04W 4/70; H04W 48/08; H04W 8/183; H04W 60/06; H04B 1/3816; H04L 67/30; H04L 67/303; H04L 67/306
(Continued)

(56) References Cited

U.S. PATENT DOCUMENTS 5,990,344 A 11/1999 Couves et al.
6,990,344 B1 * 1/2006 Dolan ............... H04W 36/0094
455/436
(Continued)

*Primary Examiner* — Charles T Shedrick

(57) ABSTRACT

A method including determining whether a subscriber identification profile (SIDP) is stored within a UE; sending an initial attach request along with a default network access key to a MME, upon determining that the SIDP is not stored; receiving a first authorization in response to the initial attach request, the first authorization restricts connectivity of the UE to an M2M activation system accessed by a dedicated APN associated with the default network access key; receiving, from a subscription management system, a SIDP generated by the M2M activation system; detaching from the M2M activation system and the network; sending a second attach request to the network based on the received SIDP; and receiving a second authorization to the network in response to the second attach request; the second authorization provides unrestricted APN connectivity and access to services associated with the subscriber identification profile.

20 Claims, 8 Drawing Sheets

(51) Int. Cl.
| | |
|---|---|
| *H04W 8/18* | (2009.01) |
| *H04W 48/08* | (2009.01) |
| *H04W 60/06* | (2009.01) |
| *H04B 1/3816* | (2015.01) |
| *H04W 8/20* | (2009.01) |
| *H04W 60/00* | (2009.01) |
| *H04L 29/08* | (2006.01) |
| *H04W 12/00* | (2009.01) |
| *H04W 88/02* | (2009.01) |
| *H04W 12/08* | (2009.01) |

(52) U.S. Cl.
CPC ......... *H04W 8/20* (2013.01); *H04W 12/0023* (2019.01); *H04W 48/08* (2013.01); *H04W 60/00* (2013.01); *H04W 60/06* (2013.01); *H04L 67/12* (2013.01); *H04W 12/004* (2019.01); *H04W 12/08* (2013.01); *H04W 88/02* (2013.01)

(58) Field of Classification Search
USPC ....................................................... 455/435.1
See application file for complete search history.

(56) References Cited

U.S. PATENT DOCUMENTS

| | | | |
|---|---|---|---|
| 7,266,371 | B1 * | 9/2007 | Amin ..................... H04W 8/18 455/418 |
| 9,860,906 | B2 | 1/2018 | Shaw et al. |
| 9,883,440 | B2 | 1/2018 | Zembutsu et al. |
| 2009/0149159 | A1 * | 6/2009 | Han ..................... H04Q 3/0025 455/414.1 |
| 2011/0256896 | A1 | 10/2011 | Giaretta et al. |
| 2011/0268047 | A1 | 11/2011 | Nath et al. |
| 2012/0155324 | A1 * | 6/2012 | Janakiraman ......... H04L 41/12 370/254 |
| 2012/0203894 | A1 | 8/2012 | Lee et al. |
| 2013/0016657 | A1 | 1/2013 | Muhanna et al. |
| 2013/0070775 | A1 | 3/2013 | Qu |
| 2013/0339438 | A1 | 12/2013 | Cherian et al. |
| 2014/0206314 | A1 | 7/2014 | Abdallas |
| 2014/0269779 | A1 | 9/2014 | Shan et al. |
| 2016/0007138 | A1 | 1/2016 | Palanisamy et al. |
| 2016/0073283 | A1 * | 3/2016 | Grayson ............... H04W 76/15 370/230 |
| 2017/0041733 | A1 * | 2/2017 | Babbage ............... H04W 8/205 |
| 2017/0048251 | A1 * | 2/2017 | Guday ................... H04W 12/08 |
| 2017/0251103 | A1 | 8/2017 | Zembutsu et al. |
| 2018/0146364 | A1 * | 5/2018 | Coureau ............. H04L 61/1511 |
| 2019/0327615 | A1 * | 10/2019 | Landais ............ H04W 12/0806 |

* cited by examiner

DEDICATED APN ACCESS USING DEFAULT NETWORK ACCESS KEY FOR PROFILE DOWNLOAD

CROSS REFERENCE TO RELATED APPLICATIONS

This application is a continuation of application Ser. No. 15/680,889, filed Aug. 18, 2017, the contents of which are hereby incorporated herein by reference in their entirety.

BACKGROUND

New applications of wireless communication technologies are driving emerging classes of user equipment (UE) devices that may include non-traditional form factors. The so-called "internet of things" (IoT) may include such devices that can be installed and operated at specific locations without the benefit of a traditional user interface (e.g., display, keyboards, buttons, etc.). The IoT can include a class of UE devices called machine-to-machine (M2M) devices that may that exchange data during normal operation without substantial or ongoing interactions with human users. While such M2M devices may typically be small in size and simple in hardware and/or software design, very large numbers of M2M devices will have to be activated for communications with wireless networks.

DETAILED DESCRIPTION OF THE PREFERRED EMBODIMENTS

Figure 1:
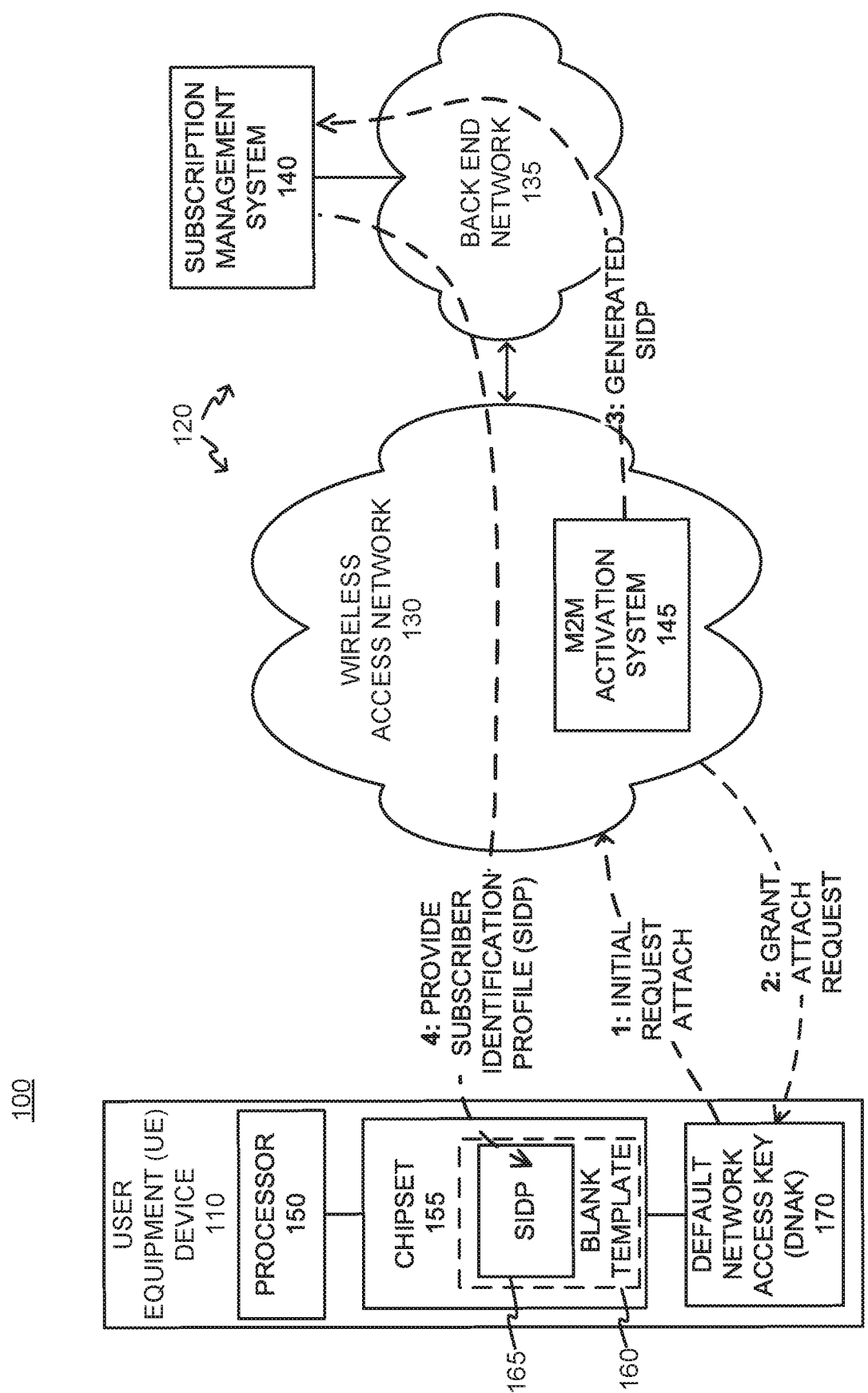
FIG. 1 is a block diagram of an exemplary environment for using a default network access key to obtain a subscriber identification profile via a dedicated access point name (APN) device.

The following detailed description refers to the accompanying drawings. The same reference numbers in different drawings may identify the same or similar elements. The following detailed description does not limit the invention.

Embodiments are directed to user equipment (UE) devices that may use a default network access key for an initial attach request to communicate with a particular system accessed by a dedicated APN. The dedicated APN may be considered as a bearer that provides restricted access to the particular system for exchanging data. In an embodiment, the particular system may be an M2M activation system that may automatically generate and provide a subscription identification profile (SIDP) associated with a service plan. Additionally, the network may automatically provision the service plan for the UE device in response to the initial attach request. Once the SIDP is stored and operational within the UE device, the UE device may subsequently reattach to the network and exchange data under the provisioned service plan.

Accordingly, embodiments leverage technology within the UE devices to provide a simple and convenient way for a user to initialize or "onboard" a UE device in accordance with a service for operation within a network. In addition, other facets of various embodiments may be useful to network operators, UE device manufacturers, and users as described below.

Existing approaches for network operations for initializing UE devices may include receiving an attach request from the UE device, and the network may read the UE device's integrated circuit card identifier (ICCID)/international mobile subscriber identity (IMSI) and check with service provisioning back end elements to identify if a subscription exists for the UE device, and if so, what level of access shall be granted. In such cases, there are many back end network and information technology (IT) elements involved. Accordingly, a single attach may create a significant amount of network traffic, which may present challenges given the large number of M2M devices. However, in various embodiments, when a UE device sends an initial attach request along with a default network access key, the network may skip checking for subscription existence from back end devices/systems (e.g., from a mobility management entity (MME) and/or a home subscriber server (HSS)), and rapidly grant a limited and restricted access to a dedicated APN for exchanging data with the M2M activation system that provides a subscription identification profile (SIDP) to the UE device. Traditionally a large block of (ICCID)/(IMSI) values may be reserved by a network operator in a device management database, one pair of ICCID/IMSI for each UE device. Thus, regardless of whether a UE device is activated or not, ICCID/IMSI values will be reserved and thus "consumed." Because in conventional systems, ICCID/IMSI values may be stored in the operator's device management database indefinitely, resources may be consumed, memory may be wasted, searching may be delayed, and processing power may be taxed, in establishing and maintaining the database for millions of devices which may never be activated.

Regarding UE device manufacturers, accommodations may be made for network cellular modem vendors and the subscriber identity module (SIM) vendors. UE devices may utilize embedded universal integrated circuit cards (eUICC) that incorporate embedded subscriber identity modules (eSIMs). In such a case, manufacturers must wait for SIM vendors to ship eSIMs before incorporating them into the UE devices, thus creating a dependency and potential point of failure in the manufacturing process. Moreover, prior to being incorporated into a UE device, the SIM manufacturer undergoes a lengthy process to create and preload a profile into each eSIM that is specific to the mobile network operator. Various embodiments described herein may use a UE device having a blank template within a chipset (e.g., which may include an eUICC) which may have downloaded therein a subscriber identification profile (e.g., in some embodiments, an eSIM) via the network.

A user subscribing to a wireless service plan for the UE device no longer needs to activate the UE device at the point of sale. Thus, if a user wishes to activate a service plan at a later date, the user does not have to return the UE device to the point of sale, or interact with customer support which may be time consuming and frustrating. Additionally, users will not have to concern themselves with ICCID and/or IMEI values (which may not be printed on the device, or included in packaging materials that may be unavailable). Moreover, M2M devices may have a minimal or no user interface for entering long ICCID and/or IMEI values, thus making the initialization of the device by a user difficult even upon receiving remote support via a telephone or the internet. As noted above, various embodiments described herein eliminate the aforementioned issues, and thus provide an easy "onboading" experience for the UE device.

Thus, embodiments described herein provide a convenient UE device onboarding approach by accessing via the network a dedicated APN associated with a default network access key. Embodiments described herein improve the initialization and operation of UE devices with the network by simplifying the integration of SIMs into UE devices, saving a network operator's storage and network resources, and improving the user's experience.

FIG. 1 is a block diagram of an exemplary environment 100 for using a default network access key to obtain a subscriber identification profile via a dedicated access point name (APN) device. Environment 100 may include a user equipment (UE) device 110, which may further include a processor 150, a chipset 155, and a default network access key 170. Chipset 155 may further include a blank template 160 for storing a subscriber identification profile (SIDP) 165. Environment 100 may further include a subscription management system 140. UE device 110 and subscriber management system 140 may be interconnected by network 120 to provide communications over a variety of different connections. Network 120 may include wireless access network 130 and back end network 135. For ease of explanation, only one UE device 110 and one subscriber management system 140 are illustrated as being connected to network 120. However, it should be understood that a large number of UE devices 110, subscriber management systems 140, or other known network entities, may be communicatively coupled to network 120.

UE device 110 may communicate wirelessly with wireless access network 130 using any type of wireless channel, including cellular standards such as long term evolution (LTE), and other local, mesh, and/or wide area wireless networking standards (e.g., any type of WiFi networking). Wireless access network 130 may communicate with back end network 135 over backhaul network wired connections (e.g., fiber optic connections) and/or wireless connections (e.g., microwave links). Back end network 135 may communicate with other network devices, such as subscription management system 140, over private and/or public networks, including the Internet, using any appropriate wireless and/or wired connections.

Network 120 may include a plurality of networks of any type, and may be broadly grouped into a wireless access network 130 and a back end network 135. Wireless access network 130 may further include a machine-to-machine (M2M) activation system 145, which is accessible from a dedicated access point name (APN), as described in more detail below. Wireless access network 130 provides connectivity between UE device 110 and other network elements within wireless access network 130 and/or devices connected to back end network 135. Wireless access network 130 may include any type of wireless network, such as, for example, one or more telecommunications networks including wireless public land mobile networks (PLMNs). The PLMN(s) may include a Global System for Mobile Communications (GSM) PLMN, a Long Term Evolution (LTE) PLMN, and Advanced LTE PLMN, and/or other types of cellular networks and/or PLMNs not specifically described herein. Wireless access network 130 may further include one or more local and/or wide area wireless network. A local area wireless network may include any type of WiFi (e.g., any IEEE 802.11x network, where x=a, b, c, g, and/or n). A wide area wireless network may include any type wireless network covering larger areas, and may include a mesh network (e.g., IEEE 802.11s) and/or or a WiMAX IEEE 802.16.

Back end network 135 may exchange data with wireless access network 130 to provide UE device 110 connectivity to various servers, gateways, and other network entities, which may include one or more subscriber management system 140. Back end network 135 may include a wide area network (WAN), a metropolitan area network (MAN), an intranet, the Internet, a wireless satellite network, a cable network (e.g., an optical cable network).

UE device 110 may include any type of electronic device having communication capabilities, and thus communicate over network 120 using a variety of different channels, including both wired and/or wireless connections. UE device 110 may include, for example, any type of M2M device which may be part of the IoT, which may include, for example, sensors, cameras, appliances, measurement devices, security devices, traffic control devices, vehicle navigation devices, parking meters, connected appliances, medical devices, etc. UE device 110 may further include a cellular radiotelephone, a smart phone, a tablet, a wireless hotspot (e.g., a Jetpack device), a set-top box (STB), a mobile phone, a Voice over Internet Protocol (VoIP) device, a laptop computer, a palmtop computer, a gaming device, or a media player device that includes communication capabilities (e.g., wireless communication mechanisms). UE device 110 may include processor 150 that may primarily function at the operating system and application level, and exchange user data within the access stratum. UE device 110 may further include a modem (not shown) that performs signal processing and communications operations for communicating over a wireless channel. UE device 110 may also include chipset 155 that may provide one or more processors, "glue" logic, memory, a secure element, etc., for performing secure operations. In some embodiments, chipset 155 may include an embedded universal integrated circuit card (eUICC). Chipset 155 may include secure storage (e.g., non-volatile solid state memory) designated as blank template 160 as a place holder for receiving and storing a subscriber identification profile (SIDP) 165, and a default network access key (DNAK) 170. DNAK 170 may be used to access M2M activation system 145, via a dedicated APN, to generate and provide SIDP 165 via network 120. Details of processor 150, chipset 155, blank template 160, SIDP 165, and default network access key 170 are provided below in reference to FIG. 3.

M2M activation system 145 may be a device that can be accessed using a particular APN which may be uniquely associated with default network access key 170. M2M activation system 145 may be a standalone device, (such as, for example, a server), or may be embodied as a software module residing in another element or device in wireless access network 130, as described in more detail below in reference to FIG. 2. M2M activation system 145 can automatically generate SIDPs 165 and provision a service plan for the UE device in response to an initial attach request, as will be described below.

Subscriber management system 140 may be a network device that facilitates the remote over the air provisioning of UE devices with SIDPs 165. For example, subscriber management system 140 may communicate with UE device 110 over access network 120 and back end network 135 using conventional protocols to provision an M2M device with an embedded subscriber identity module (eSIM) that may be stored in chipset 155, for example, in an eUICC. Additionally, subscriber management system 140 may communicate with other network infrastructure devices (not shown) over back end network 135. While only one subscriber management system 140 is shown in FIG. 1, in various embodiments, multiple subscriber management systems 140 may be associated with different entities and used within environment 100.

Further referring to FIG. 1, the following is an example of UE device 110 using a default network access key to communicate via a dedicated APN to access M2M activation system 145. M2M activation system 145 may generate SIDP 165 which is provided to UE device 110 via network 120, and also establish the service plan for UE device 110 associated with SIDP 165. Initially UE 110 may, upon initial power up and/or in response to a predetermined command provided by a user, scan to find a targeted operators' network. Upon detecting the network, UE 110 may send an initial attach request to wireless access network 130 in accordance with the standard network procedures (see: 1. INITIAL ATTACH REQUEST). The initial attach request may include default network access key (DNAK) 170 instead of using UE device's 110 international mobile subscriber identity (IMSI) as is typically used in a conventional attach request to wireless access network 130. Wireless access network 130 may associate the received DNAK 170 with a dedicated APN for accessing M2M activation system 145. In an embodiment, the internet protocol (IP) address of M2M activation system 145 may be white listed on the dedicated APN in order to provide UE 110 with restricted access. In response, wireless access network 130 may grant the initial attach request (see 2. GRANT ATTACH REQUEST) and allow UE 110 restricted access to wireless access network 120. This restricted access prohibits UE 110 from accessing other devices via the dedicated APN with the exception of M2M activation system 145. Thus, this restricted access prohibits UE 110 from any other type of APN access, such as, for example access to chat services, VoIP services, internet multimedia services (IMS), Internet services, administrative services, etc. After UE 110 has been granted restricted access to wireless access network 130, M2M activation system 145 may generate a SIDP 165 and then automatically provision a service plan with wireless access network 130 that is associated with SIDP 165. M2M activation system 145 may then send the SIDP 165 to subscription management system 140 via back end network 135 (see 3. GENERATED SIDP). Subscription management system 140 may then provide the SIDP 165 to UE device 110 for storage into blank template 160 using conventional delivery techniques (see 4: PROVIDE SUBSCRIBER IDENTIFICATION PROFILE (SIDP)). The SIDP 165 may include various information, including the network operator's operational profile, aspects of the service plan, identification information of the user, and/or authorization parameters and/or encryption keys for access to normal wireless access network 130. Once UE 110 stores SIDP 165 into blank template 160 of chipset 155, UE device 110 may disconnect from wireless access network 130 and subsequently reattach to the network based on, for example, a conventional attach procedure using the IMSI of UE device 110. Once the conventional attach procedure is performed, UE 110 may exchange data under the provisioned service plan that allows unrestricted access to other network devices providing a variety of services consistent with the service plan corresponding to the SIDP.

Figure 2:
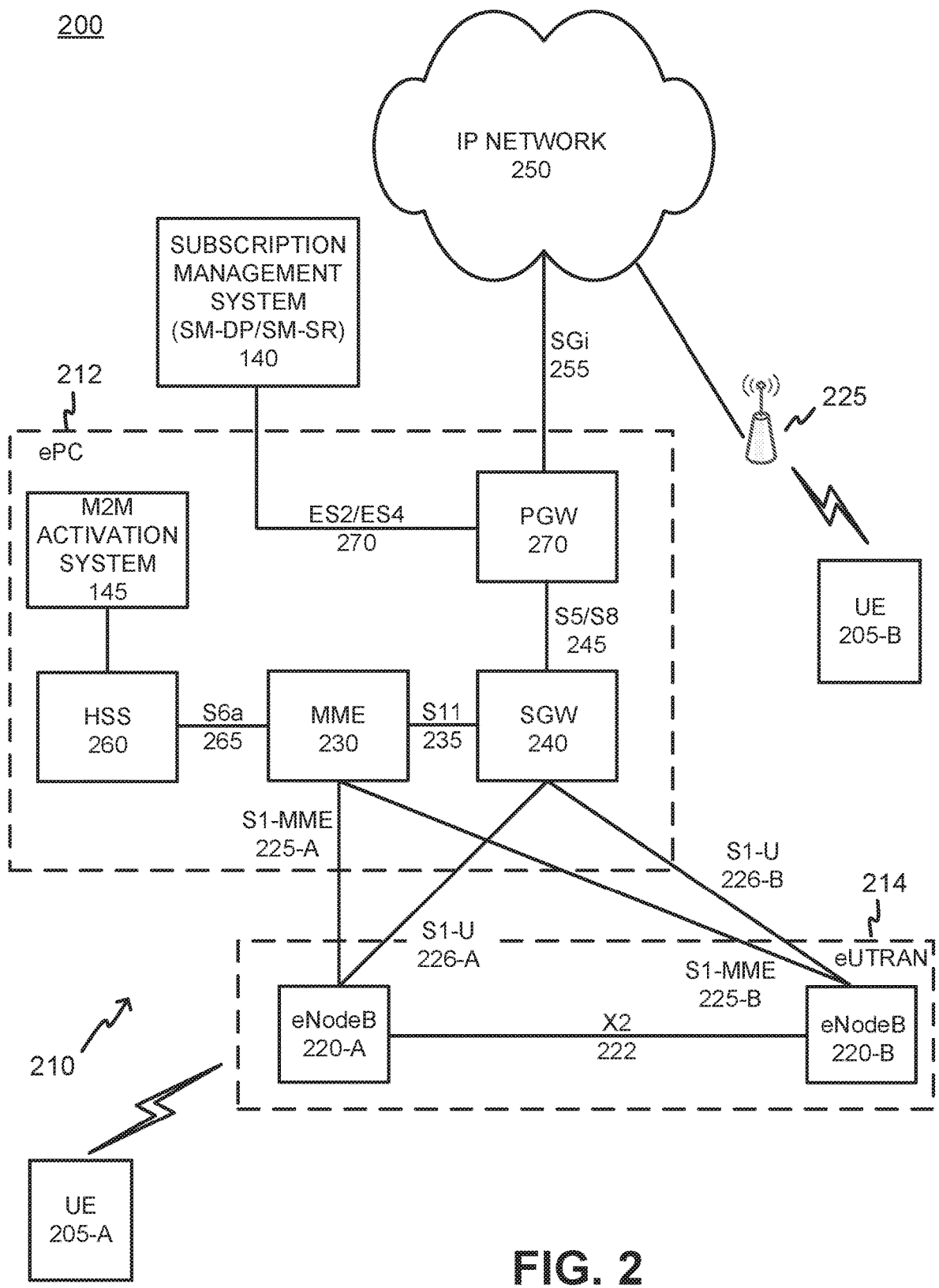
FIG. 2 is a block diagram of an exemplary networking system having a long term evolution (LTE) wireless access network.

FIG. 2 is a block diagram of an exemplary networking system 200 having a long term evolution (LTE) wireless access network. Networking system 200 may include UE device 110 embodied as UEs 205-A and 205-B (as used herein, collectively referred to as "UE 205" and individually as "UE 205-*x*"), wireless access network 130 embodied as an LTE wireless network 210, which includes an evolved Packet Core (ePC) 212 and an evolved Universal Mobile Telecommunications System (UMTS) Terrestrial Network (eUTRAN) 214, an Internet Protocol (IP) network 250 which may be embodied as or included in back end network 135, a WiFi wireless access point (WAP) 225, and subscription management system 140. In this example, subscription management system 140 may be embodied as a subscription manager-data preparation (SM-DP) device and a subscription manager-secure routing device (SM-SR). The SM-DP may securely package SIDPs 165 to be provisioned on UE device 110. The SM-SR provides secure transport over the network of SIDPs 165 and profile management commands in order to load, enable, disable, and delete SIDPs 165 from UE device 110 based on the network operator's policy rules.

LTE wireless network 210 may include one or more devices that are physical and/or logical entities interconnected via standardized interfaces. LTE wireless network 210 provides wireless packet-switched services and wireless IP connectivity to user devices to provide, for example, which include data, voice, and/or multimedia services. The ePC 212 may further include a mobility management entity (MME) 230, a serving gateway (SGW) device 240, a packet data network gateway (PGW) 270, and a home subscriber server (HSS) 260, and M2M activation system 145. In FIG. 2, M2M activation system 145 is shown as a separate module which may be implemented as separate device. In another embodiment, M2M activation system 145 may be included in the HSS 260 and/or the MME 230, and may be implemented as a software module, a hardware module, or a firmware module. The eUTRAN 214 may further include one or more eNodeBs 220 (herein referred to collectively as "eNodeB 220" and individually as "eNodeB 220-*x*"). It is noted that FIG. 2 depicts a representative networking system 200 with exemplary components and configuration shown for purposes of explanation. Other embodiments may include additional or different network entities in alternative configurations than which are illustrated in FIG. 2.

Further referring to FIG. 2, each eNodeB 220 may include one or more devices and other components having functionality that allow UE 205 to wirelessly connect to eUTRAN 214. ENodeB 220 may interface with ePC 212 via a S1 interface, which may be split into a control plane S1-MME interface 225-A and a data plane S1-U interface 226-A. S1-MME interface 225-A may interface with MME 230. S1-MME interface 225-A may be implemented, for example, with a protocol stack that includes a Non-Access Stratum (NAS) protocol and/or Stream Control Transmission Protocol (SCTP). S1-U interface 226-A may interface with SGW 240 and may be implemented, for example, using a General Packet Radio Service Tunneling Protocol version 2 (GTPv2). ENodeB 220-A may communicate with eNodeB 220-B via an X2 interface 222. X2 interface 222 may be implemented, for example, with a protocol stack that includes an X2 application protocol and SCTP.

MME 230 may implement control plane processing for LTE wireless network 210. For example, MME 230 may implement tracking and paging procedures for UE 205, may activate and deactivate bearers for UE 205, may authenticate a user of UE 205 and/or register UE 205 to provide mobile directory number (MDN) values, and may interface to non-LTE radio access networks. A bearer may represent a logical channel with particular quality of service (QoS) requirements. MME 230 may also select a particular SGW 240 for a particular UE 205. A particular MME 230 may interface with other MMEs 230 in ePC 212 and may send and receive information associated with UEs 205, which may allow one MME 230 to take over control plane processing of UEs serviced by another MME 230, if the other MME becomes unavailable. MME 230 may communicate with SGW 240 through an S11 interface 235. S11 interface 235 may be implemented, for example, using GTPv2. S11 interface 235 may be used to create and manage a new session for a particular UE 205. S11 interface 235 may be activated when MME 230 needs to communicate with SGW 240, such as when the particular UE 205 attaches to ePC 212, when bearers need to be added or modified for an existing session for the particular UE 205, when a connection to a new PGW 270 needs to created, or during a handover procedure (e.g., when the particular UE 205 needs to switch to a different SGW 240).

SGW 240 may provide an access point to and from UE 205, may handle forwarding of data packets for UE 205, and may act as a local anchor point during handover procedures between eNodeBs 220. SGW 240 may interface with PGW 270 through an S5/S8 interface 245. S5/S8 interface 245 may be implemented, for example, using GTPv2.

PGW 270 may function as a gateway to IP network 250 through a SGi interface 255. IP network 250, which may provide various services (e.g., over the top voice services) to UE 205. A particular UE 205, while connected to a single SGW 240, may be connected to multiple PGWs 270, one for each packet network with which UE 205 communicates.

Alternatively, UE 205 may exchange data with IP network 250 though WiFi wireless access point WAP 225. The WiFi WAP 225 may be part of a local area network, and access IP network 250 through a wired connection via a router. Alternatively, WiFi WAP 225 may be part of a mesh network (e.g., 801.11s). WiFi WAP 225 may be part of a local area network, or part of a wide area network (WiMaxx) or a mesh network (801.11s).

HSS 260 may store information associated with UEs 205 and/or information associated with users of UEs 205. For example, HSS 260 may store user profiles that include registration, authentication, and access authorization information. For example, HSS 260 may associate user subscription to service plans associated with a particular SIDP 165. MME 230 may communicate with HSS 260 through an S6a interface 265. S6a interface 265 may be implemented, for example, using a Diameter protocol. M2M activation system 145 may communicate with HSS 260 over an appropriate interface when implemented as a separate device. In other embodiments, M2M activation system 145 may be incorporated, for example, into HSS 260 and be implemented as a software module or a plug-in hardware module.

Subscription management system 140 may communicate with PGW 270 over an ES2/ES4 interface. In an embodiment, subscription management system 140 may include the SM-DP device to securely package SIDPs 165 to be provisioned on UE device 110. The SM-DP device may communicate with PGW 270 over an ES2 interface to obtain data from other network elements (e.g., M2M activation system 145) to receive SIDPs 165 and other profile and/or operational information. The SM-SR provides secure transport over the network of SIDPs 165 and profile management commands over an ES4 interface to PGW 270, in order to load, enable, disable, and delete SIDPs 165 from UE device 110 based on the network operator's policy rules.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
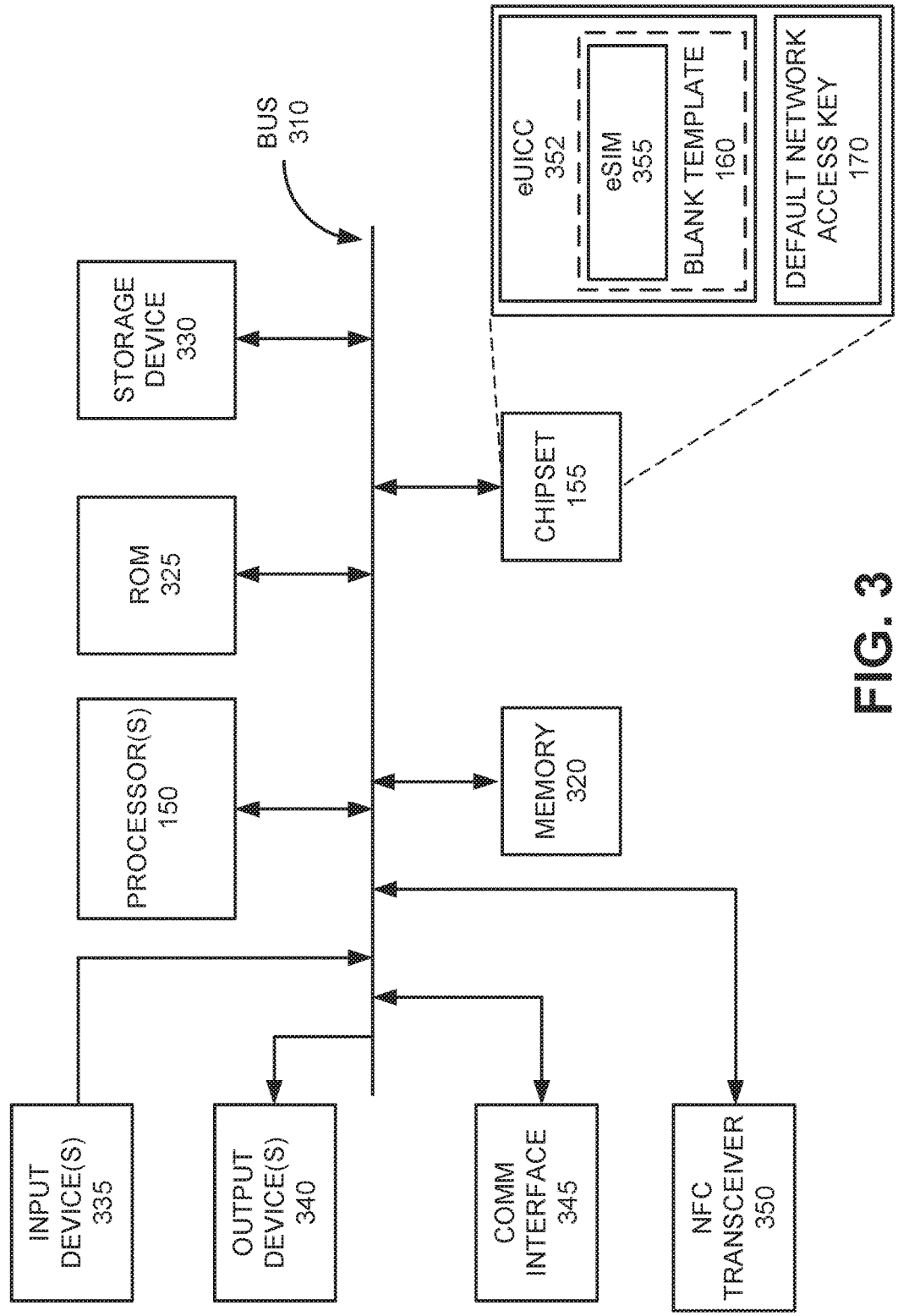
FIG. 3 is a block diagram showing exemplary components of a UE device according to an embodiment.

FIG. 3 is a block diagram showing exemplary components of UE device 110 according to an embodiment. UE device 110 may include one or more processor(s) 150. In some embodiments, a modem (not shown) may be included as a separate processor, or integrated with processor 150 and chipset 155. UE device 110 may further include a bus 310, a memory 320, a storage device 330, an input device(s) 335, an output device(s) 340, a communication interface 345, and a Near Field Communications (NFC) transceiver 350. Bus 310 may include a path that permits communication among the elements of UE device 110.

Processor 150 may include a processor, microprocessor, or processing logic that may interpret and execute instructions. Memory 320 may include a random access memory (RAM) or another type of dynamic storage device that may store information and instructions for execution by processor 150. Memory 320 may further include read only memory (ROM) by incorporating a ROM device or another type of static storage device that may store static information and instructions for use by processor 150. Storage device 330 may include a high density non-volatile RAM suitable for mass storage, and/or magnetic and/or optical recording medium and a corresponding drive.

Input device(s) 335 may include one or more mechanisms that permit an operator to input information to UE device 110, such as, for example, a keypad or a keyboard, a microphone, voice recognition and/or biometric mechanisms, etc. Output device(s) 340 may include one or more mechanisms that output information to the operator, including a display, a speaker, etc. Communication interface 345 may include any transceiver mechanism that enables UE device 110 to communicate with other devices and/or systems. For example, communication interface 345 may include mechanisms for communicating with another device or system via a network, such as network 120. A Near Field Communications (NFC) transceiver 350 may interface with bus 310 to permit UE device 110 to exchange data with NFC readers, thus allowing convenient transactions with appropriately equipped Point of Sale terminals, kiosks, building security gateways, etc.

Chipset 155 may provide "glue" logic for interfacing with processor 150, memory 320, and other components of UE device 110 over bus 310. Additionally, chipset 155 may include one or more internal processors and internal memory (e.g., volatile and/or non-volatile RAM) which may be electrically isolated from bus 310 and/or thus other components of UE device 110 for performing secure operations. For example, chipset 155 may include a so-called secure element and/or a secure enclave. In some embodiments, as shown in the example illustrated in FIG. 3, chipset 155 may include an embedded universal integrated circuit card (eUICC). EUICC 352 may include its own secure processor, I/O circuits, and secure storage (e.g., non-volatile solid state memory such as RAM and/or ROM, volatile RAM, electrically erasable programmable ROM (EEPROM), etc.) to hold blank template 160 as a place holder for receiving and storing a subscriber identification profile (SIDP) 165. Blank template 160 may be considered as reserved storage space for SIDP 165, and thus blank template 160 not a conventional bootstrap profile. A conventional bootstrap profile is an operator's provisioning profile that may provide data connectivity to access a remote SIM provisioning platform in order to download an operational profile. Embodiments provided herein do not require any such provisioning or bootstrap profile.

In the example shown in FIG. 3, SIDP 165 may be an embedded subscriber identity module (eSIM) 355 which is stored in to blank template 160. EUICC 352 may also store default network access key 170 used for access to M2M activation system 145. UE device 160 may be shipped without a wireless network operator's SIM profile, however chipset 155 may be certified by the operator with, in an embodiment, a built in default network access key (DNAK) 170 and a blank template 160 for a profile. DNAK 170 may be defined using different options. In one embodiment, a DNAK 170 may be created based on international mobile equipment identifier (IMEI) of the device, as described in more detail in reference to FIGS. 6A and 6B. In another embodiment, DNAK 170 may be a hard-coded key that is the same across all UE devices 160 from the same manufacturer, or the same for all UE devices 160 regardless of manufacturer. In another embodiment, a network operator may provide or specify for the manufacturer of chipset 155 or UE device 110, a secure software agent for installation in chipset 155 (e.g., eUICC), and/or a secure element, that may generate various DNAKs 170 based on other parameters such as, for example, the international mobile equipment identity (IMEI) of UE device 110. The secure software agent may be automatically activated when UE device 110 detects no SIDP 160 and/or other operating profile upon powering on UE device 110. In an embodiment, the DNAK 170 may be temporarily saved in chipset 155 (e.g., eUICC, secure element, etc.) so UE device 110 may perform an initial attach to ePC 212 to download SIDP 160 and/or establish service on network 120. In an embodiment, an IMEI value used to generate DNAK 170 may use a specific mobile country code (MMC)/mobile network code (MNC) prefix that may be anchored to M2M activation system 145 for used in the provisioning of UE device 160.

UE device 110 may perform certain operations or processes, as may be described in detail below. UE device 110 may perform these operations in response to at least one processor 150 executing software instructions contained in a computer-readable medium, such as memory 320. A computer-readable medium may be defined as a physical or logical memory device. A logical memory device may include memory space within a single physical memory device or spread across multiple physical memory devices.

The software instructions may be read into memory 320 from another computer-readable medium, such as storage device 330, or from another device via communication interface 345. The software instructions contained in memory 320 may cause processor 150 to perform operations or processes that will be described in detail with respect to FIGS. 6A and 6B. Alternatively, hardwired circuitry may be used in place of or in combination with software instructions to implement processes consistent with the principles of the embodiments. Thus, exemplary implementations are not limited to any specific combination of hardware circuitry and software.

The configuration of components of UE device 110 illustrated in FIG. 3 is for illustrative purposes only. It should be understood that other configurations may be implemented. Therefore, UE device 110 may include additional, fewer and/or different components than those depicted in FIG. 3.

Figure 4:
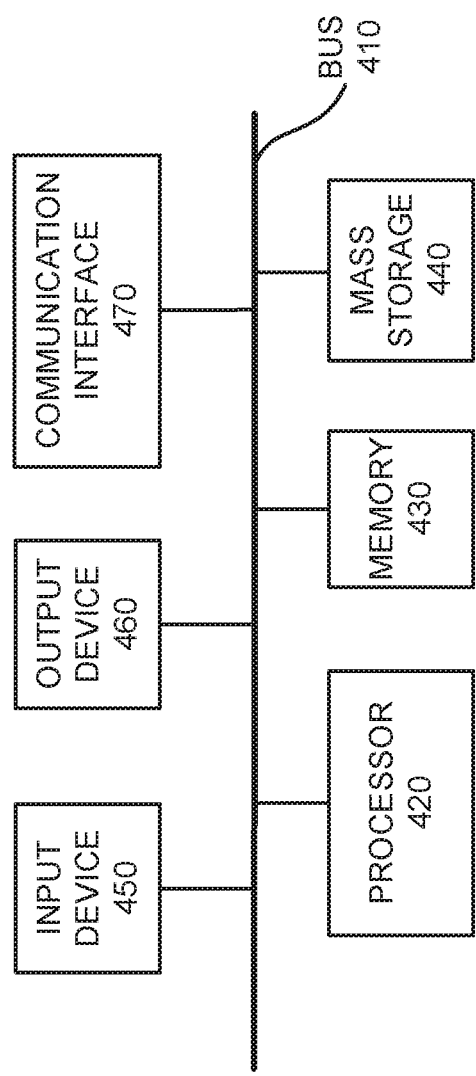
FIG. 4 is a block diagram showing exemplary components of a network element which may reside in a component in a networking system.

FIG. 4 is a block diagram showing exemplary components of a network element 400 which may reside in a component in networking system 200, such as, for example subscription management system 140, M2M activation system 145, MME 230, SGW 240, HSS 260, and/or PGW 270. Network element 400 may include a bus 410, a processor 420, a memory 430, mass storage 440, an input device 450, an output device 460, and a communication interface 470.

Bus 410 includes a path that permits communication among the components of network element 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux. Processor 420 may also use high-level analysis software packages and/or custom software written in any programming and/or scripting languages for interacting with other network entities.

Memory 430 may include any type of dynamic storage device that may store information and/or instructions, for execution by processor 420, and/or any type of non-volatile storage device that may store information for use by processor 420. For example, memory 430 may include a RAM or another type of dynamic storage device, a ROM device or another type of static storage device, and/or a removable form of memory, such as a flash memory. Mass storage device 440 may include any type of on-board device suitable for storing large amounts of data, and may include one or more hard drives, solid state drives, and/or various types of Redundant Array of Independent Disk (RAID) arrays.

Input device 450, which may be optional, can allow an operator to input information into network element 400, if required. Input device 450 may include, for example, a keyboard, a mouse, a pen, a microphone, a remote control, an audio capture device, an image and/or video capture device, a touch-screen display, and/or another type of input device. In some embodiments, network element 400 may be managed remotely and may not include input device 450. Output device 460 may output information to an operator of network element 400. Output device 460 may include a display (such as a Liquid Crystal Display (LCD)), a printer, a speaker, and/or another type of output device. In some embodiments, network element 400 may be managed remotely and may not include output device 460.

Communication interface 470 may include a logical component that includes input and/or output ports, input and/or output systems, and/or other input and output components that facilitate the transmission of data to other devices. For example, communication interface 470 may include a network interface card (e.g., Ethernet card) for wired communications and/or a wireless network interface (e.g., a Wi-Fi) card for wireless communications. Communication interface 470 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form. Communication interface 470 may further include one or more Radio Frequency (RF) transceivers that enable communications with UE devices 110 via wireless channels in eUTRAN 214. An RF transceiver may include an RF transmitter that receives signals to be transmitted wirelessly and performs signal processing on the signals before providing the signals to an antenna assembly (not shown), and an RF receiver (not shown) that receives signals from the antenna assembly and performs signal processing on the received signals before providing the received signals to processor 420. For example, the RF transceiver may perform analog-to-digital and digital-to-analog conversion, modulation and demodulation, up-conversion and down-conversion, and/or amplification of signals.

Figure 5A:
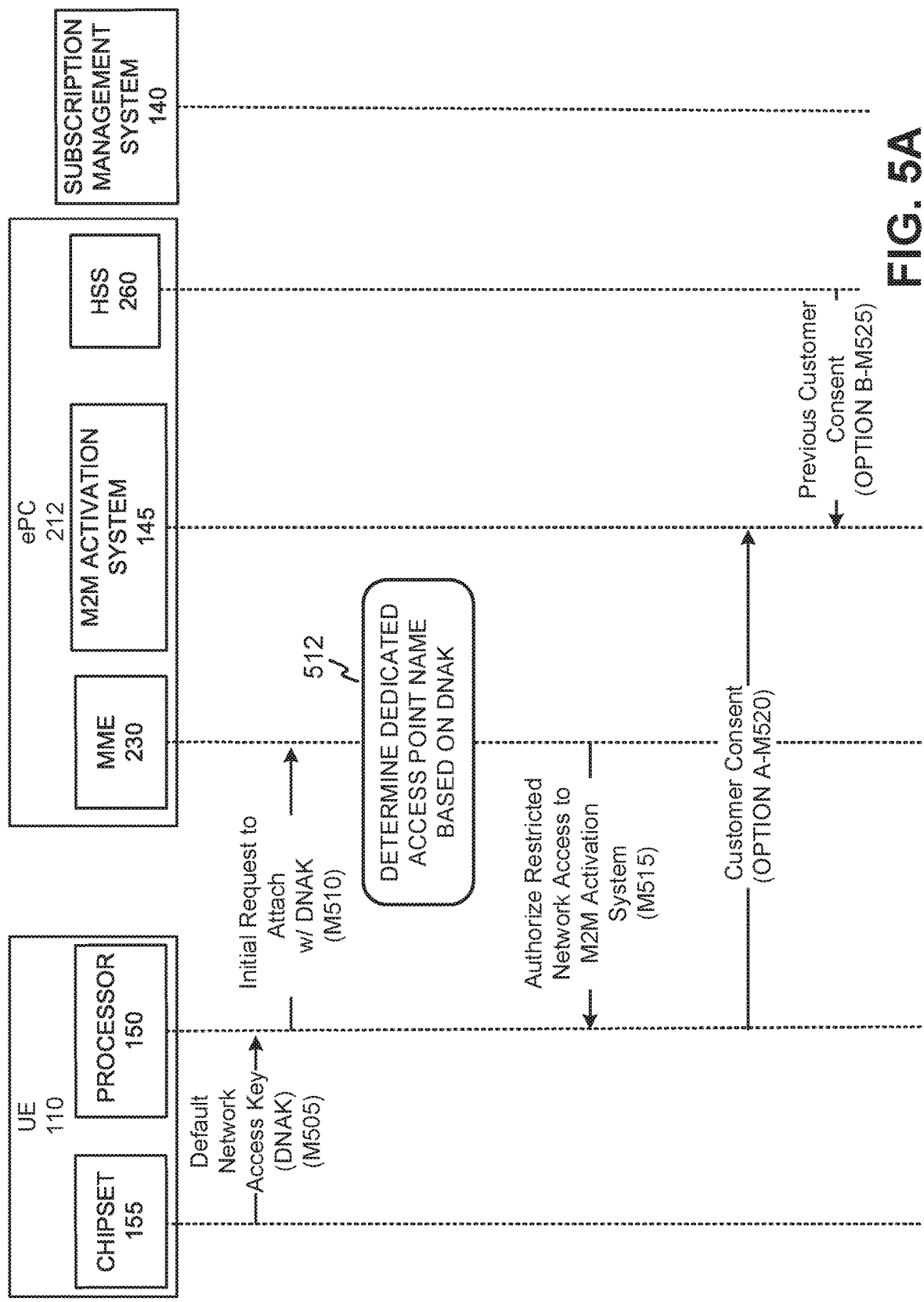
FIGS. 5A and 5B are exemplary signal flow diagrams illustrating communications between network entities according to an embodiment.
Figure 5B:
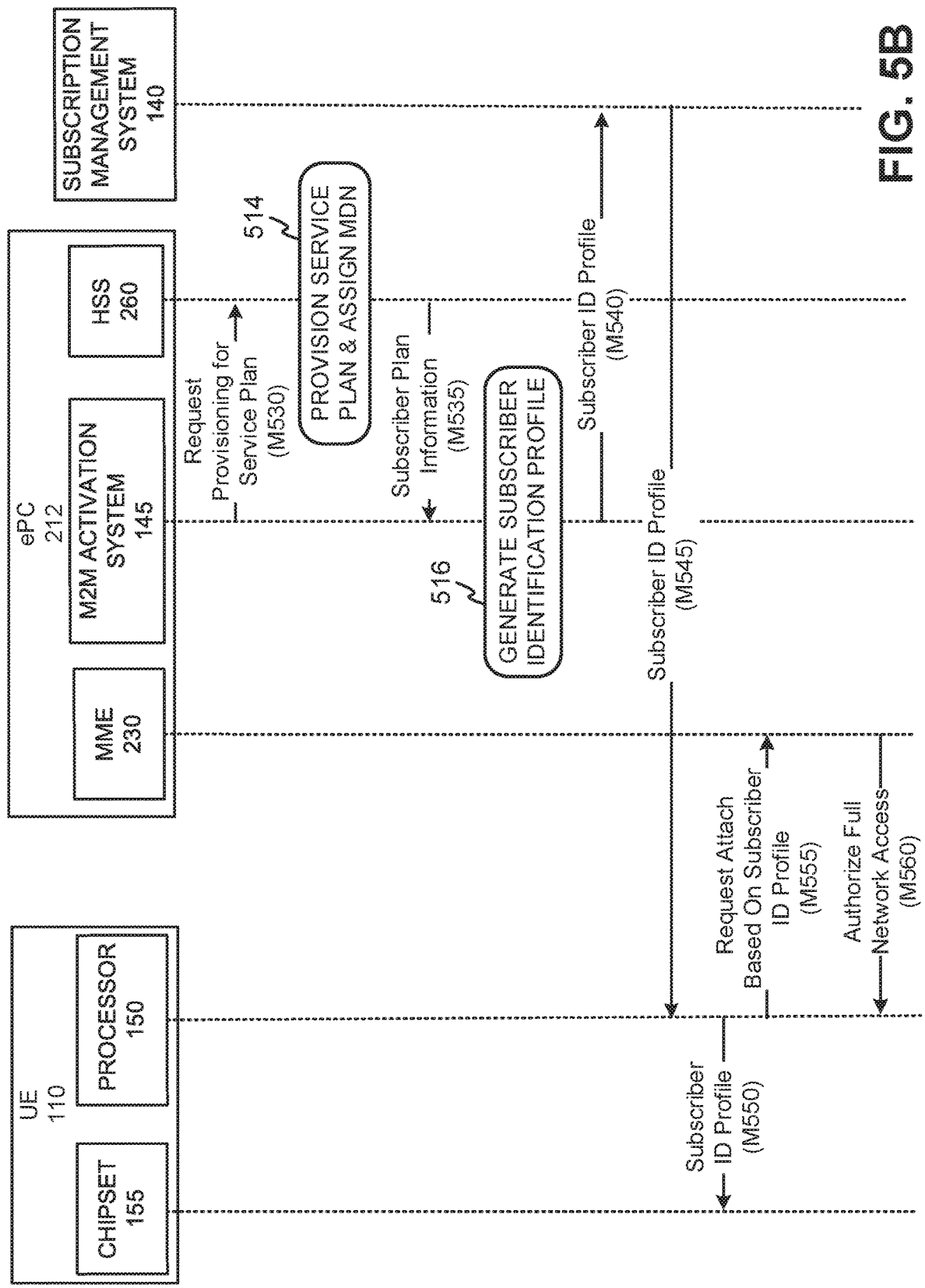

As described below, network element 400 may perform certain operations relating to PGW 270, MME, 230, M2M activation system 145, HSS 260, and/or subscription management system 140 (or other devices/systems in networking environment 200). Network element 400 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein, such as, for example, steps or messages transferred as shown in FIG. 5A and FIG. 5B. Alternatively, hardwired circuitry may be used in place of, or in combination with, software instructions to implement processes described herein. Thus, implementations described herein are not limited to any specific combination of hardware circuitry and software. Although FIG. 4 shows exemplary components of network element 400, in other implementations, network element 400 may include fewer components, different components, additional components, or differently arranged components than depicted in FIG. 4.

FIGS. 5A and 5B are exemplary signal flow diagrams illustrating communications between network entities according to an embodiment. As shown in FIG. 5A, within UE device 110, processor 150 may receive default network access key (DNAK) 170 from chipset 155 (M505). Processor 150 may then generate and send an initial request to attach to MME 230 (M510). The initial request to attach may include DNAK 170 to be used in a key exchange for authentication with ePC 212. The procedure associated with the initial request to attach M510 remains compliant with existing wireless standards (e.g., 3GPP). However, when a device requests to attach with the DNAK 170, ePC 212 may not check for an existence of a subscription from elements such as HSS 260 and/or MME 230 to gain fast access to a dedicated APN for exchanging data with M2M activation system 145. In the initial request to attach M510, DNAK 170 may be used for authentication instead of, for example, the IMSI of UE device 110.

MME 230 may then determine a dedicated access point name that is associated with DNAK 170 (Block 512). The dedicated access point name may be associated with M2M activation system 145. MME 230 may then send an authorization granting the request to attach to ePC 212 (M515). The authorization restricts access to M2M activation system 145, and thus other services may not be obtained during the connection that is authorized based on the DNAK 170. In one embodiment, processor 150 may interactively solicit customer consent for the service authorized using DNAK 170 (OPTION A—M520). For example, the customer may interactively affirm to subscribe to a service plan and consent to the provisions of a customer service contract. In another embodiment, the customer consent may be provided prior to the initial request to attach M510, and stored in ePC 212 (e.g., in HSS 260) (OPTION B—M525). Option B may be based on a timeout value or triggered by a request from UE device 110 to provide consent without user interaction.

Referring to FIG. 5B, M2M activation system 145 may send a request provision for service plan (M530), to HSS 260. HSS 260 may then provision a service plan associated with the SIDP 165 and assign a mobile directory number (MDN) to UE device 110 (Block 514). HSS 260 may then send subscriber plan information to M2M activation system 145 (M535). M2M activation system 145 may then generate SIDP 165 (Block 516). M2M activation system 145 may then send the SIDP 165 to subscription management system 140 (M540). Subscription management system 140 may then send the SIDP 165 to UE 110, which may be received by processor 150 (M545). Processor 150 may then provide the SIDP 165 to chipset 155, where it may be stored in blank template 160. UE device 110 may then disconnect from ePC 212 (such as by resetting processor 150 (e.g., resetting a modem which may be included in processor 150). Processor 150 may then send a request to attach based on the SIDP 165 to MME 230 (M555). MME 230 may receive the request and authorize full network access (M560).

Figure 6A:
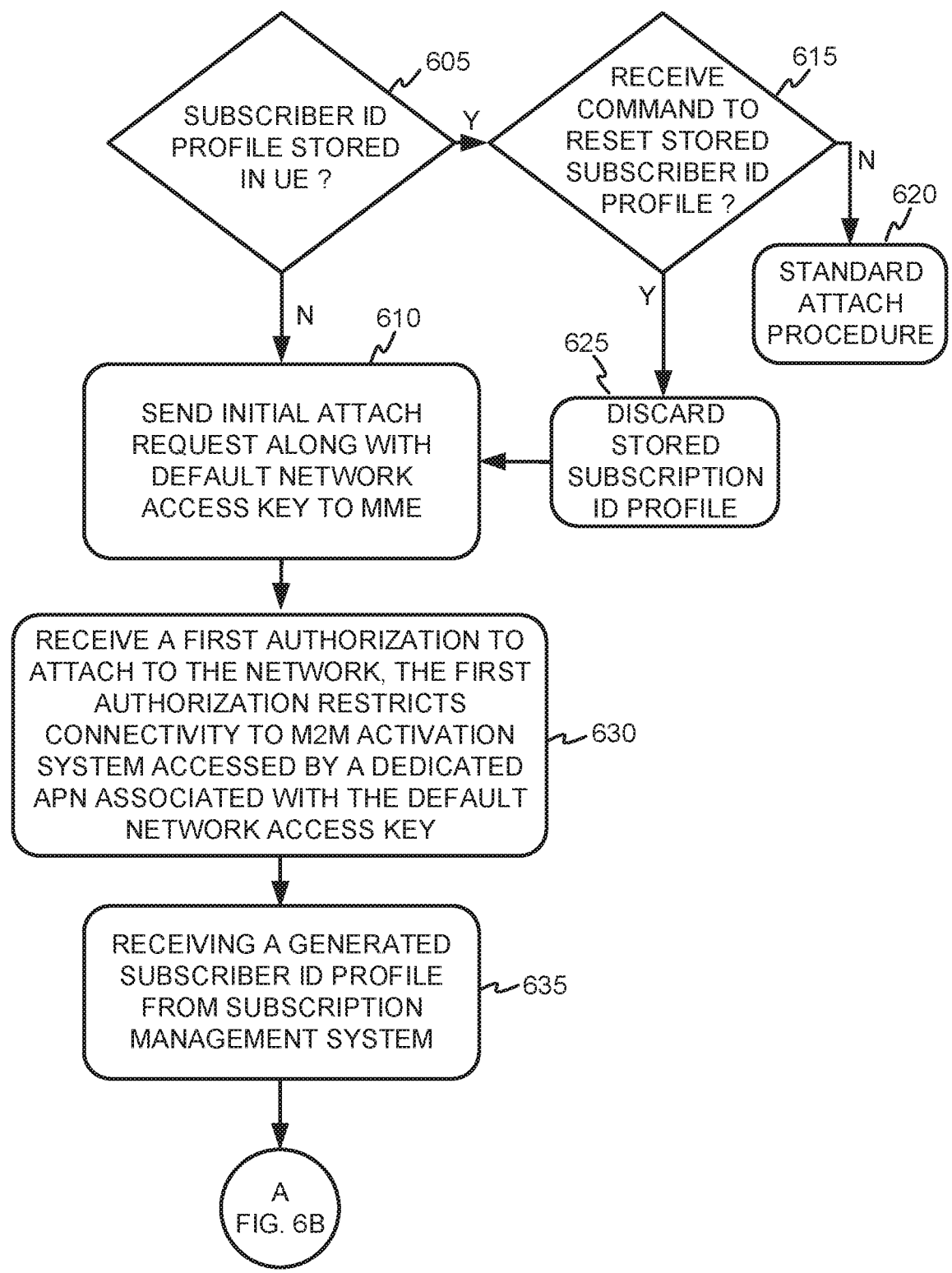
FIGS. 6A and 6B are flow charts showing an exemplary process for a UE device to download a subscription identification profile, generated by an M2M activation system, using a default network access key.
Figure 6B:
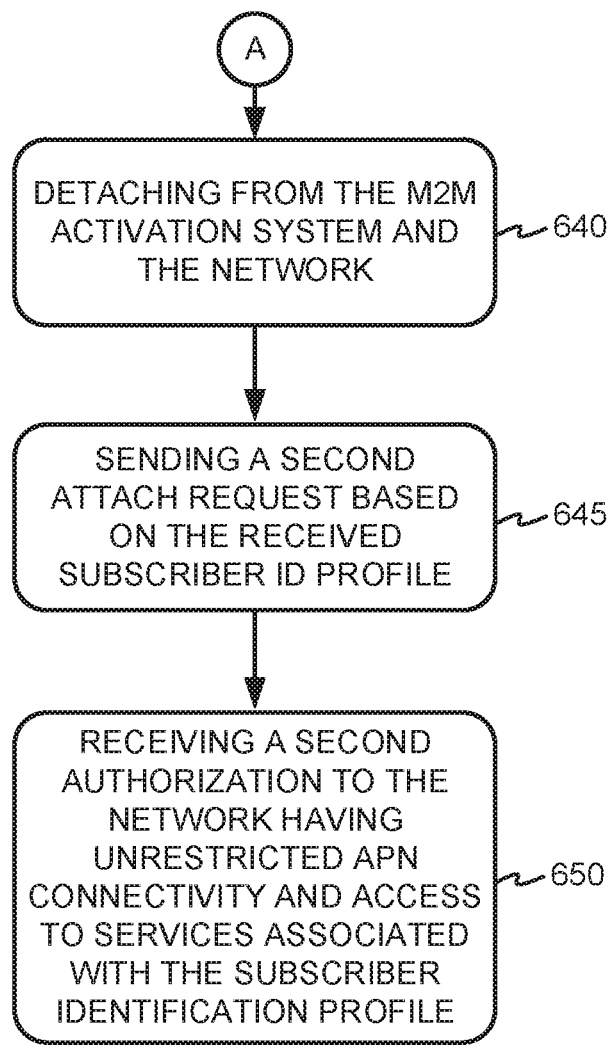

FIGS. 6A and 6B are flow charts showing an exemplary process 600 for a UE device 110 to download SIDP 165, generated by M2M activation system 145, using a DNAK 170. In an embodiment, process 600 may be executed by one or more processors residing in UE device 110, which include processor 150, a modem, and/or secure processor(s) within chipset 155 (e.g., residing within an eUICC and/or a secure element). Initially, UE device 110 may determining whether a subscriber identification profile is stored within UE 110 device (Block 605). This may be done upon initially powering on UE device 110 or when the UE device 110 is power cycled.

Upon UE device 110 determining that no SIDP 165 is stored in chipset 155 (or any other storage element depending upon various other embodiments), UE device 110 may scan and find wireless access network 130. UE device 110 may send an initial attach request, along with a default network access key (DNAK) 170, to MME 230 (Block 610). In an embodiment, UE device 110 may use the standard 3GPP IMSI based attach procedure; however, instead of using a real IMSI, the DNAK 170 is used in the attach procedure. In an embodiment, UE 110 may receive instructions via wireless access network 130 for generating the DNAK 170, where the instructions may generate the DNAK 170 based one or more values including: the IMEI of the UE device, individual subscriber authentication key (Ki, Kix), encryption algorithm identifier values, and/or integrity algorithm identifier values. UE 110 may generate DNAKs 170 by automatically activating the instructions upon an initial powering on of UE device 110, and determining that the SIDP 165 is not stored in UE device 110. Once generated, UE 110 may save DNAK 170 in memory, which may include memory devices in chipset 155 (e.g., including eUICC 322), or in a secure element. In an embodiment, the IMEI of UE device 110 used in generating the default network access key includes at least one of a specific mobile country code (MCC) prefix or a specific mobile network code (MNC) prefix which may be anchored to the M2M activation system.

Referring back to Block 605 in FIG. 6A, if UE device 110 determines an SIDP 165 is stored in chipset 155 (or any other storage element depending upon various other embodiments), UE device 110 may further determine whether a predetermined command was received to reset SIDP 165

(Block 615). If a predetermined command was not received, UE device 110 may perform a standard attach procedure using the IMSI value (Block 620). Alternatively, in response to UE device 110 determining a predetermined command was received to reset SIDP 165, UE device 110 may discard SIDP 165 currently stored in UE device 110 (e.g., erasing the memory storing SIDP 165, or flagging the memory to be overwritten with a new SIDP 165) (Block 625), and send the initial attach request along with DNAK 170 to MME 230 (Block 610). In an embodiment, determining whether a predetermined command was received may include having UE device 110 receive an activation of a switch sequence, a simultaneous activation of a combination of switches, an activation of a dedicated switch, and/or a switch actuation lasting a predetermined period of time. The predetermined command may further include receiving the predetermined command upon the powering on of UE device 110. A switch may be activated by physical buttons on UE device 110, graphical controls activated by a touch screen display, and/or other recessed controls activated by a tool such as, for example, a pen or paper clip.

In response to sending the initial attach request in Block 610, UE 110 may receive a first authorization to attach to wireless network 130 from MME 230 (Block 630). Network access 120 associated with the first authorization restricts connectivity of UE device 110 to a machine-to-machine (M2M) activation system 145, accessed by the dedicated APN associated with DNAK 170. The restricted access serves as a so-called "walled garden," where UE device 110 does not have access to other network devices which can provide other services, such as, for example Internet connectivity, chat services, MMS services, VoIP services, etc.

In an embodiment, UE device 110 may receive a request to provide customer consent for a service subscription associated with SIDP 165 generated by M2M activation system 145. In response, UE 110 may prompt the user to provide customer consent after receiving the first authorization to attach to the network. Once the user's consent is received, UE device 110 may send the customer consent to wireless network 130. In an alternative embodiment, the customer consent may have been previously received and stored within the network (e.g., in HSS 260), and retrieved prior to wireless access network 130 sending the first authorization to attach to the network that is received by the UE device 110 in Block 630.

UE device 110 may then receive SIDP 165 from subscription management system 140, via wireless network 130 (Block 635). SIDP 165 may be stored in UE device 110 in chipset 155 (e.g., eUICC 352). In an embodiment, SIDP 165 may be generated by M2M activation system 145.

Turning to FIG. 6B, UE device 110 may detach from M2M activation system 145 and wireless access network 130 (Block 640). UE device 110 may the send a second attach request to the network based on the SIDP 165 and may use the IMSI for registration with the MME 230 per a standard attach procedure (Block 645). In response to the second attach request, the UE 110 may receive a second authorization to wireless access network 130 in response to the second attach request, where the second authorization provides unrestricted APN connectivity for UE 110 and access to services associated with the subscriber identification profile (Block 650).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 5A-6B, the order of the messages and/or blocks may be modified in other embodiments. Further, non-dependent messaging and/or processing blocks may be performed in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
 obtaining, by a user equipment (UE) device, a first authorization from a network based on a default network access key, wherein the first authorization is obtained without providing an international mobile subscriber identity (IMSI) and allows restricted access of the UE device through a dedicated access point name (APN) determined by a mobility management entity (MME) based on the default network access key;
 receiving, at the UE device, a subscriber identification profile from a subscription management system associated with the dedicated APN; and
 obtaining, by the UE device, a second authorization from the network based on the received subscriber identification profile, wherein the second authorization provides unrestricted APN connectivity and access to services associated with the subscriber identification profile.

2. The method of claim 1, wherein obtaining the first authorization comprises:
sending, from the UE device, an initial attach request along with the default network access key to the MME within the network; and
receiving, at the UE device, the first authorization in response to the initial attach request, wherein the first authorization restricts connectivity of the UE device to a machine-to-machine (M2M) activation system.

3. The method of claim 2, wherein obtaining the second authorization comprises:
detaching the UE device from the M2M activation system and the network;
sending, from the UE device, a second attach request to the network based on the received subscriber identification profile; and
receiving, at the UE device, the second authorization to the network in response to the second attach request.

4. The method of claim 1, further comprising:
determining, by the UE device, whether the subscriber identification profile is stored within the UE device.

5. The method of claim 4, wherein upon determining that the subscriber identification profile is stored in the UE device, further comprising:
determining whether a predetermined command was received to reset the stored subscriber identification profile, and in response to determining the predetermined command was received:
discarding the stored subscriber identification profile from the UE device;
sending an initial attach request along with the default network access key to an MME within the network; and
performing an attach procedure upon determining that the predetermined command was not received.

6. The method of claim 5, wherein determining whether the predetermined command was received further comprises:
identifying at least one of an activation of a switch sequence, a simultaneous activation of a combination of switches, an activation of a dedicated switch, or a switch actuation lasting a predetermined period of time.

7. The method of claim 5, wherein determining whether the predetermined command was received further comprises:
receiving the predetermined command upon powering on the UE device.

8. The method of claim 2, further comprising:
receiving instructions via the network for generating the default network access key, wherein the instructions generate the default network access key based on at least one of the international mobile equipment identity (IMEI) of the UE device, an individual subscriber authentication key (Ki, Kix), encryption algorithm identifier values, or integrity algorithm identifier values;
generating the default network access key by automatically activating the instructions upon an initial powering on of the UE device and determining that the subscriber identification profile is not stored in the UE device; and
saving the default network access key in the UE device.

9. The method of claim 8, wherein the IMEI of the UE device used in generating the default network access key includes at least one of a specific mobile country code (MCC) prefix or a specific mobile network code (MNC) prefix which is anchored to the M2M activation system.

10. The method of claim 2, further comprising:
receiving a request to provide customer consent for a service subscription associated with the subscriber identification profile generated by the M2M activation system;
prompting a user to provide customer consent after receiving the first authorization; and
sending customer consent to the network in response to the prompting.

11. A user equipment (UE) device, comprising:
a chipset configured to store a subscriber identification profile and a default network access key;
at least one memory configured to store instructions; and
at least one processor configured to execute the instructions to:
obtain a first authorization from a network based on the default network access key, wherein the first authorization is obtained without providing an international mobile subscriber identity (IMSI) and allows restricted access of the UE device through a dedicated access point name (APN) determined by a mobility management entity (MME) based on the default network access key;
receive a subscriber identification profile from a subscription management system associated with the dedicated APN; and
obtain a second authorization from the network based on the received subscriber identification profile, wherein the second authorization provides unrestricted APN connectivity and access to services associated with the subscriber identification profile.

12. The UE device of claim 11, wherein the instructions that obtain the first authorization further cause the at least one processor to:
send an initial attach request along with the default network access key to the MME within the network; and
receive the first authorization in response to the initial attach request, wherein the first authorization restricts connectivity of the UE device to a machine-to-machine (M2M) activation system.

13. The UE device of claim 12, wherein the instructions to obtain the second authorization further causes the at least one processor to:
detach the UE device from the M2M activation system and the network;
send a second attach request to the network based on the received subscriber identification profile; and
receive the second authorization to the network in response to the second attach request.

14. The UE device of claim 11, wherein the instructions further cause the at least one processor to:
determine whether the subscriber identification profile is stored within the UE device.

15. The UE device of claim 14, wherein in response to the processor determining that the subscriber identification profile is stored in the UE device, the instructions further cause the at least one processor to:
determine whether a predetermined command was received to reset the stored subscriber identification profile, and in response to determining the predetermined command was received:
discard the stored subscriber identification profile from the UE device; and send the initial attach request along with the default
network access key to the MME within the network;
and perform an attach procedure upon determining that the
predetermined command was not received.

16. The UE device of claim 15, wherein the instructions to determine whether the predetermined command was received further cause the at least one processor to:

identify at least one of an activation of a switch sequence, a simultaneous activation of a combination of switches, an activation of a dedicated switch, or a switch actuation lasting a predetermined period of time.

17. The UE device of claim 15, wherein the instructions to determine whether the predetermined command was received further causes the at least one processor to:

receive the predetermined command upon powering on the UE device.

18. The UE device of claim 12, further comprising instructions causing the at least one processor to:

receive instructions via the network for generating the default network access key, wherein the instructions generate the default network access key based on at least one of the international mobile equipment identity (IMEI) of the UE device, an individual subscriber authentication key (Ki, Kix), encryption algorithm identifier values, or integrity algorithm identifier values;

generate the default network access key by automatically activating the instructions upon an initial powering on of the UE device and determining that the subscriber identification profile is not stored in the UE device; and save the default network access key in the UE device.

19. The UE device of claim 18, wherein the IMEI of the UE device used in generating the default network access key includes at least one of a specific mobile country code (MCC) prefix or a specific mobile network code (MNC) prefix which is associated with the M2M activation system.

20. A non-transitory computer-readable medium comprising instructions, which, when executed by at least one processor, cause the at least one processor to:

obtain, by a user equipment (UE) device, a first authorization from a network based on a default network access key, wherein the first authorization is obtained without providing an international mobile subscriber identity (IMSI) and allows restricted access of the UE device through a dedicated access point name (APN) determined by a mobility management entity (MME) based on the default network access key;

receive, at the UE device, a subscriber identification profile from a subscription management system associated with the dedicated APN; and obtain, by the UE device, a second authorization from the network based on the received subscriber identification profile, wherein the second authorization provides unrestricted APN connectivity and access to services associated with the subscriber identification profile.

* * * * *